United States Patent [19]

Peters

[11] Patent Number: 4,522,062
[45] Date of Patent: Jun. 11, 1985

[54] DIGITAL PROCESSOR FOR USE WITH AN ACCELEROMETER BASED ANGULAR RATE SENSOR

[75] Inventor: Rex B. Peters, Woodinville, Wash.

[73] Assignee: Sundstrand Data Control, Inc., Redmond, Wash.

[21] Appl. No.: 528,775

[22] Filed: Sep. 2, 1983

[51] Int. Cl.$^3$ .................... G01C 23/00; G01C 19/56; G01P 15/08
[52] U.S. Cl. ...................................... 73/505; 73/510; 73/517 R
[58] Field of Search ..................... 73/505, 510, 517 R, 73/517 B

[56] References Cited

U.S. PATENT DOCUMENTS

| | | | |
|---|---|---|---|
| 3,470,747 | 10/1969 | Rasmussen | 73/517 B |
| 3,940,636 | 2/1976 | Perahia | 73/517 R |
| 4,445,376 | 5/1984 | Merhav | 73/517 R |

Primary Examiner—James J. Gill
Attorney, Agent, or Firm—Michael B. McMurry; Ted E. Killingsworth; Harold A. Williamson

[57] ABSTRACT

In a structure utilizing a pair of accelerometers vibrating in a direction normal to their force sensing axes, a circuit utilizing voltage-to-frequency converters is utilized to convert the analog output signals from the accelerometers to digital signals representing the translational motion and the angular rate rotation of the structure.

17 Claims, 5 Drawing Figures

DIGITAL PROCESSOR FOR USE WITH AN ACCELEROMETER BASED ANGULAR RATE SENSOR

RELATED PATENT APPLICATIONS

The subject matter of the application is related to the co-pending patent applications Merhav Ser. No. 357,714 filed Mar. 12, 1982 now U.S. Pat. No. 4,445,376, Ser. No. 357,715 filed Mar. 12, 1982, now abandoned in favor of Ser. No. 528,776 filed Sept. 2, 1983 which are directed to apparatus and methods for measuring specific force and angular rate of a moving body utilizing moving accelerometers.

TECHNICAL FIELD

The invention relates to circuits for deriving inertial specific force and angular rate signals for a moving body from a plurality of cyclically driven accelerometers. In particular, the invention relates to digital circuits for providing digital specific force and angular rate signals from a pair of accelerometers being vibrated in a direction normal to their sensitive axes.

BACKGROUND OF THE INVENTION

In the above cited patent applications as well as the article, circuits are described for separating force signals from angular rotation signals from the output of a single or a pair of accelerometers that are either being cyclically rotated or vibrated at a constant frequency $\omega$. In these circuits the analog output signal from the accelerometer(s) is integrated over the period T of one cycle of $\omega$ by an integrating circuit and then applied to a sample and hold circuit to obtain a specific force signal F. At the same time, the output signals from the accelerometer(s) are multiplied by the zero mean function signal sgncos$\omega$t. This signal is then integrated over the period T and applied to a sample and hold circuit. The resulting signal, as described in detail in the above cited patent applications and article, represents the rotation of the accelerometer(s) with respect to the force sensing axis of the accelerometer(s).

Due to the fact that inertial navigation systems, for which the above described force and angular rate measuring systems find particular application, require digital inputs at some point because they employ digital computers, it is quite often necessary to convert the voltage or current output signals from the accelerometers representing specific force and angular rate into digital form.

SUMMARY OF THE INVENTION

It is therefore an object of the invention to provide a circuit that can accept analog signals from one or two accelerometers vibrating in a direction normal to their force sensing axis and to convert those signals into digital signals that represent a force signal and an angular rate signal.

It is an additional object of the invention to provide a circuit for deriving from an acceleration signal produced by an accelerometer moving with a periodic frequency $\omega$ an angular rate signal wherein the circuit includes a sign switching circuit for multiplying the acceleration signal by a zero mean periodic function of the frequency $\omega$; a conversion circuit for converting the multiplied acceleration signal into a frequency signal and a counter for generating a digital representation of angular rate from the frequency signal. The circuit can also include a second conversion circuit for converting the acceleration signal into a second frequency and a second counter for generating a digital representation of the force sensed by the accelerometer in response to the second frequency signal.

It is a further object of the invention to provide a circuit for deriving, from acceleration signals produced by a pair of accelerometers which are being vibrated at a frequency $\omega$ within a frame of reference in a direction normal to their sensitive axes, a force signal representing acceleration of the frame of reference along the sensitive axis and an angular rotation signal representing the angular rotation of the frame of reference about an axis normal to the direction of vibration. This circuit includes a pulse generator circuit for generating pulses that have a frequency functionally related to $\omega$; a preprocessor circuit that includes a first summing circuit for combining the acceleration signals into an analog signal representing the acceleration of the frame of reference along the sensitive axis substantially without components representing angular rotation of the frame of reference and a second summing circuit for combining the acceleration signals into an analog signal substantially without components representing acceleration of the frame of reference along the sensitive axis and containing components representing the angular rotation of the frame of reference. Also included in the circuit is a sign switching circuit for multiplying the analog rate signal by the periodic zero mean function sgncos$\omega$t; a first voltage-to-frequency converter for converting the analog force signal into a first frequency signal; a second voltage-to-frequency converter for converting the multiplied analog rate signal to a second frequency signal; a first counter circuit responsive to the pulse generator circuit that is effective to count the cycles of the first frequency signal over a predetermined portion of the frequency $\omega$ to generate a digital force signal and a second counter circuit responsive to the pulse generator for counting the cycles of the second frequency signal over the predetermined portion of the frequency $\omega$ to generate a digital rate signal.

Another object of the invention is to provide the circuits as described above with a correction circuit that combines the outputs of the counters with values that represent the scale factors of accelerometers to enhance the accuracy of the digital force and angular rate signals.

DETAILED DESCRIPTION OF THE INVENTION

The digital processing circuit as described in this application utilizes accelerometer output signals from which are derived the components of a specific force vector F and the components of an angular rate vector $\Omega$ while the undesirable components of these signals are suppressed. The accelerometer signals are received from either a single accelerometer or a pair of accelerometers that are vibrated or otherwise moved in a cyclical or periodic motion in response to a periodic signal having a frequency $\omega$. The direction of motion of the accelerometers is normal to the force sensing axis of the accelerometers so that the accelerometer output signals will include angular rate components resulting from coriolis forces sensed by the accelerometer. Detailed theory of the use of accelerometers to obtain angular rate information in an inertial system is contained in the previously cited Merhav patent applications. As discussed in these patent applications, angular rate information is derived from an accelerometer output signal by multiplying that signal by a zero mean periodic function having a frequency $\omega$ of the form sgncos$\omega$t, integrating that multiplied signal over the period T of one cycle of $\omega$ and using a sample and hold circuit to retain a voltage which represents a value of the angular rotation for the period T about an axis normal to the axis of vibration. A specific force signal representing the acceleration of a structure containing the accelerometer(s) in a direction along the force sensing axis is similarly generated by integrating the accelerometer output over the period T. In this manner, the force and angular rotation signals are effectively separated from each other and as a result can be derived from an accelerometer output signal.

Figure 1:
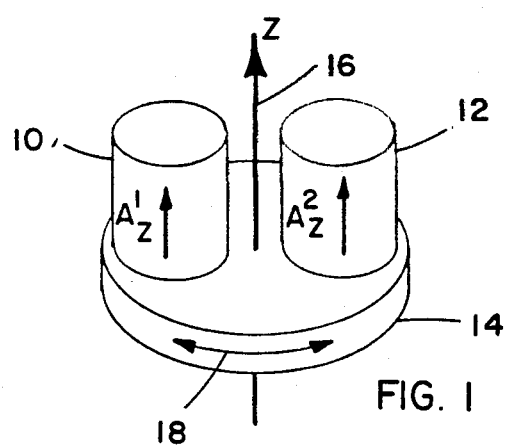
FIG. 1 is a simplified perspective diagram of paired accelerometers having their force sensing axes parallel to an axis of angular vibration.
Figure 2:
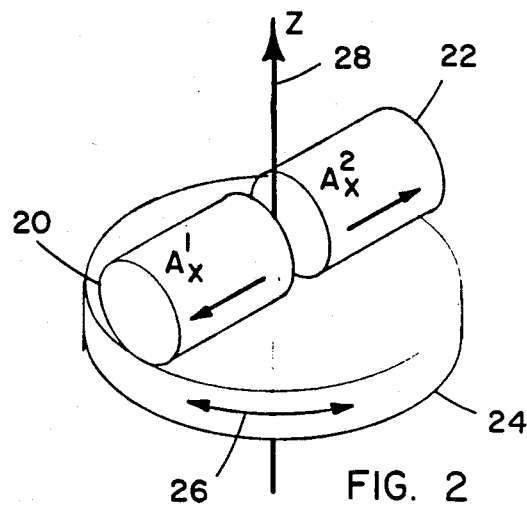
FIG. 2 is a simplified perspective diagram of paired accelerometers arranged back-to-back with their force sensing axes normal to an axis of angular vibration.
Figure 3:
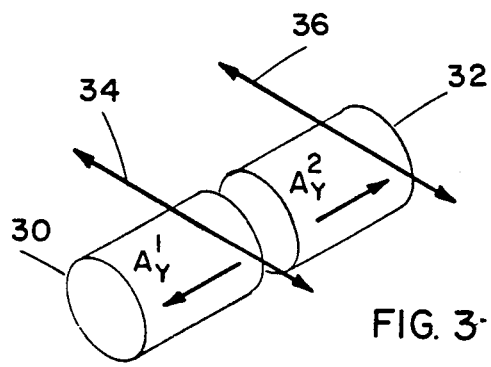
FIG. 3 is a simplified diagram of paired accelerometers arranged back-to-back with their force sensing axes normal to the direction of linear vibration.

The paired accelerometer arrangements illustrated in FIGS. 1-3 provide significant improvements over a single accelerometer in terms of signal strength for both the force signal and the angular rate signal while at the same time achieving a reduction in signal noise. A particular advantage of utilizing accelerometers arranged in pairs as shown in FIGS. 1-3 is that the noise present in both the force and rate signals is increased by the square root of 2 whereas the effective signal measuring force and angular rate is doubled so that the signal to noise ratio improves by a factor of the square root of 2. In addition, common acceleration disturbances in the rate signal due to external forces that may result from vehicular and mechanization sources are substantially cancelled in the type of arrangement shown.

A first arrangement of paired accelerometers is illustrated in FIG. 1 where a pair of accelerometers 10 and 12 are mounted on an angularly rotating base 14 which has a small angular vibration about a rotation axis 16 as indicated by the arrows 18. The force sensing axes $A_z^1$ and $A_z^2$ of the accelerometers 10 and 12 are in the same direction and are aligned so as to be parallel to the axis Z about which the support 14 vibrates.

A second arrangement of paired accelerometers is shown in FIG. 2 where two accelerometers 20 and 22 are mounted on a support 24 which vibrates angularly about an axis Z indicated at 28 as suggested by the arrow 26. In this arrangement the accelerometers 20 and 22 are secured to the support 24 in a back-to-back arrangement such that the force sensing axes are $A_x^1$ and $A_x^2$ are parallel but opposite in direction as well as being normal to the axis of angular vibration Z.

A third arrangement is illustrated in FIG. 3 where a pair of accelerometers 30 and 32 are arranged back-to-back with their force sensing axes $A_y^1$ and $A_y^2$ located in parallel but opposite directions. In this arrangement, the accelerometers 30 and 32 are caused to vibrate in a linear direction along an X axis as indicated by the arrows 34 and 36.

Figure 4:
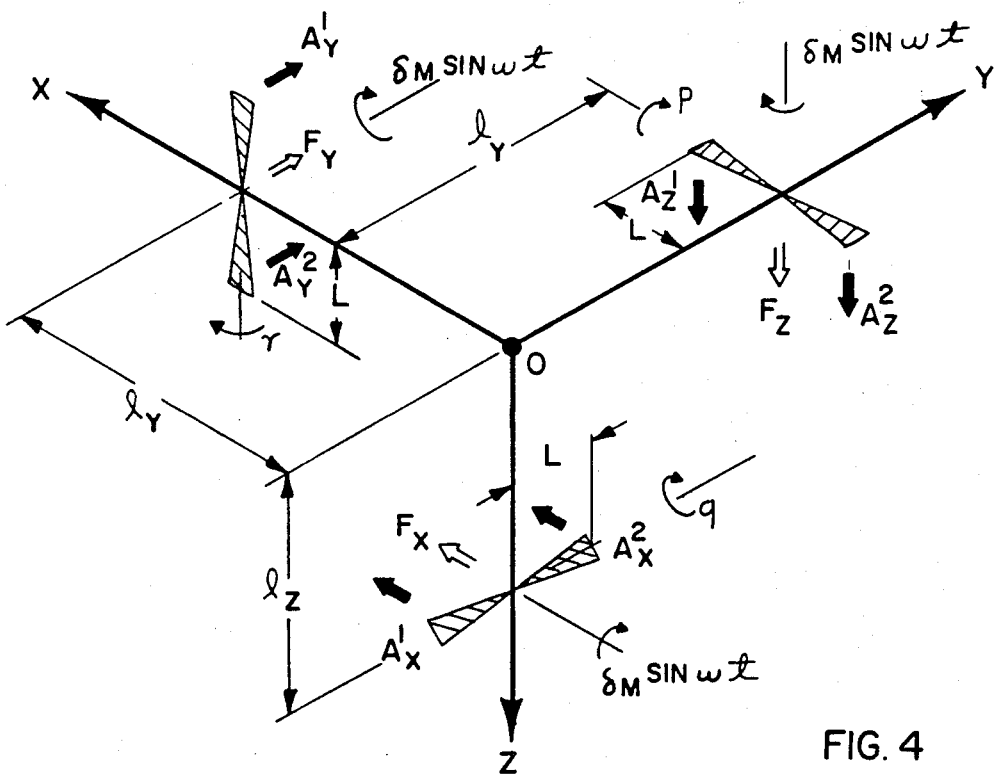
FIG. 4 is a diagram illustrating the operation of the paired accelerometer arrangement of FIG. 1 in a three axis rate sensor.

An illustration of how an arrangement or mechanism utilizing paired accelerometers of the type illustrated in FIG. 1 can be used to develop signals representing forces in angular rotation in a three axis system is provided in FIG. 4. FIG. 4 shows how the paired accelerometers 10 and 12 of FIG. 1 can be arranged in triads where the accelerometers are denoted by their force sensing axes $A_x^1, A_x^2, A_y^1, A_y^2, A_z^1$ and $A_z^2$ to provide force sensing and angular rate sensing along and about the orthogonal axes X, Y and Z which form a frame of reference for the system. The arrangement shown in FIG. 4 is suitable for use in an inertial reference system that can in turn be used in an inertial navigation system. In FIG. 4, the accelerometer pairs are vibrated at an constant angular frequency $\omega$ and a constant angular amplitude $\delta_M$. The accelerometer output signals will contain the basic information required to derive angular rotation $\Omega_i$ signals and force $F_i$ signals representing motion of the system containing the accelerometers along and about the frame of reference defined by the axes X, Y and Z.

As indicated previously and as disclosed in the Merhav patent applications Ser. Nos. 357,714 and 357,715, an analog processor having outputs represented as a pair of sample and hold voltages can be used to separate the specific force signals from the angular rate signals. One of the sample and hold voltages represents specific force averaged over the period of vibration or motion of the mechanism T and the other sample and hold voltage represents angular rate averaged over the same period T. These voltages are both up-dated once each period T which may for example be at a rate of approximately 30 Hz. It should be noted that the approximation in averaging angular rate is due to small dynamic errors which may exist for certain input motions to the accelerometers, but on the other hand, for many input motions including the case of constant rate, the average will be accurate.

Since the outputs of the above described signal derivation circuit are voltages, it is necessary to convert the output of the system to a digital format in order that the specific force and angular rate signals can be used by a digital system such as an inertial navigation system. In addition to permitting the interfacing with a digital computer, it is desirable to perform this digital conversion in order to permit digital compensation of the organized temperature behavior of the sensors.

One approach to digitizing the output of a signal deriving circuit would be merely to provide the outputs of the sample and hold circuits to an analog to digital converter. However on closer consideration, this approach albeit straight forward, has a number of disadvantages. The first problem concerns dynamic range. Signals in the specific force channel can range from 0.1 micro gs during the alignment of a inertial navigation system to 20 gs during operation of the vehicle such as a missile containing the inertial navigation system. This would require an A/D converter with a range of $2 \times 10^8$ to 1, that in turn would require 29 binary bits including a sign bit. Rate signals may even require a larger dynamic range. For example, in a strap-down application where rotation from 0.01 °/hour to 1500°/second would require a dynamic range of $5\times10^8$ to 1 that implies the use of an A/D converter having 30 binary bits including a sign bit. Digitizers capable of handling such a dynamic range are not currently available.

In addition, considering an accelerometer arrangement where the accelerometers are located back-to-back, such as shown in FIG. 2 or FIG. 3 and using a sum and difference amplifier to pre-separate the coriolis based angular rate signals from the specific force signals, such as the one shown in Merhav Ser. No. 357,714, to suppress adequately the vibration sensitivity of the rate channel of the processor, it may be necessary in many applications to match the scale factors of the two accelerometers to within 100 ppm over a wide temperature range. For example, such matching could require sensors with voltage scale factors matched by scaling resistor selection to 50–70 ppm and scale factor temperature coefficients matched by screening to 1–2 ppm/°C. Obviously, this can be an extremely expensive and inconvenient practice, especially when it is necessary to replace an accelerometer in the field.

Also the approach of merely adding an analog to digital converter to the sample and hold circuits of the processor disclosed in Merhav Ser. No. 357,715 results in a relatively complex system because it requires the full analog signal processor followed by conversion of the force and rate signals to the digital domain.

A conceptually simpler approach includes digitizing the output accelerometers directly and simulating the function of the analog processor of Merhav Ser. No. 357,715 in the digital domain by a microprocessor. In principle, this approach would permit temperature modeling of the individual accelerometers and as such eliminate the expensive analog matching discussed above. But, this approach suffers from the dynamic range problem discussed above. In fact, the dynamic range is even larger since 1500°/second rotation may not produce much more than 1 g peak signal in an accelerometer but at the same time the accelerometer must accomodate the full scale specific force which can be up to 20 gs. As a result, the dynamic range which must be digitized increases by at least 4 binary bits to something in excess of 32 bits, including a sign bit. Furthermore, this very large level digitization must be accomplished at the rate of at least 300 samples per second to allow the integration functions to be carried out numerically.

Another approach to coping with the dynamic range problems discussed above, especially in signals which are to be integrated, is to use current-to-frequency or voltage-to-frequency converters. Time integration can be performed in a counter circuit which is reset by discrete pulses of constant area. For an accelerometer, the number of frequency counts for each pulse would then represent a fixed change in velocity, for example in feet per second, and thus net velocity change. By this method, the time integral of the output signal of a voltage to frequency converter can be measured by accumulating frequency pulses in a counter.

However, if the outputs of the accelerometers are simply applied to a voltage-to-frequency converter, significant practical considerations arise. Voltage-to-frequency converters typically operate at a maximum pulse rate of about 25,000 pulses per second although voltage-to-frequency converters that operate as fast as 250,000 pulses per second have been achieved. If 250,000 pulses per second are used to represent the full scale output of an accelerometer, then taking 20 gs which is approximately 644 feet per second squared, one pulse will represent a velocity change of 0.0026 feet/second. At a sampling frequency of 30 Hz, 0.0026 feet/second corresponds to a peak acceleration of 0.49 feet per second squared or about 0.015 g. This presents a problem because the coriolis rate information appears as an alternating current signal at for example 30 Hz and for typical scaling of 0.001 g for 1°/second, 0.015 g represents 15°/second. As a result, for input rates smaller than 15°/second the oscillating signal will never produce sufficient apparent velocity change to cause the voltage-to-frequency converter to emit even a single pulse. Thus, as a rate sensor, the accelerometer system will have a threshhold of 15°/second, which is not normally considered to be an acceptable performance level for an inertial navigation system.

Figure 5:
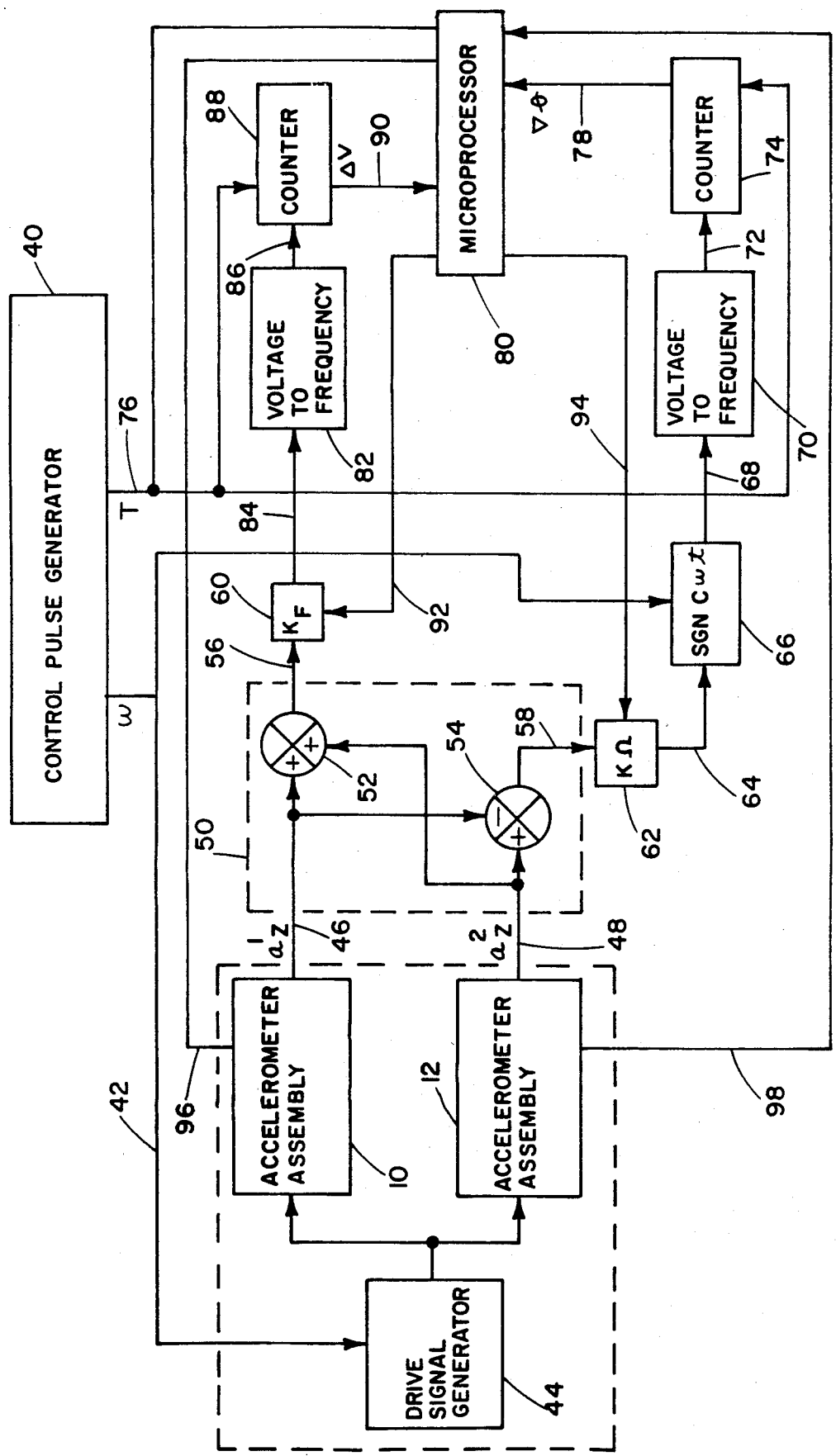
FIG. 5 is a block diagram of a digital signal separating circuit for use with a pair of accelerometers.

In FIG. 5 is provided a block diagram of the preferred embodiment of a circuit for overcoming the problems discussed above. The primary purpose of this circuit is to separate components from the output signals of accelerometers 10 and 12 that represent force or change in angular velocity along the sensitive axes of the accelerometer from components that represent angular rotation of the accelerometers about an axis normal to the axis of vibration. The basic theory of signal separation by which the circuit in FIG. 5 operates is the same as the one described in detail in Merhav Ser. No. 357,714. For purposes of illustration, the accelerometer assembly, including accelerometers 10 and 12 will be the same as illustrated in FIG. 1 but it will be understood that the circuit arrangement of FIG. 5 could easily be modified to accept the accelerometer arrangements of FIGS. 2 and 3.

Included in the circuit of FIG. 5 is a control pulse generator 40 which generates a series of pulses on a line 42 that is functionally related to the frequency $\omega$ which is utilized as input to a drive signal generator 44. The purpose of the drive signal generator 44 is to vibrate the accelerometers 10 and 12 in an angular direction as shown in FIG. 1 with a frequency $\omega$. Accelerometers 10 and 12 will then output on lines 46 and 48 acceleration signals $a_z^1$ and $a_z^2$ respectively.

Receiving the acceleration signals on lines 46 and 48 is a preseparation circuit 50 which includes summing junctions 52 and 54. Since the force sensing axes of accelerometers 10 and 12 as shown in FIG. 1 are aligned in the same direction, the output of summing junction 52 on line 56 will be a signal that effectively sums the sensed acceleration of accelerometers 10 and 12 along the force sensing axis Z as shown in FIG. 1 while at the same time substantially eliminating the angular rate components generated by coriolis forces. Similarly, the accelerometer output signals on lines 46 and 48 are differenced in the summing junction 54 to provide a signal on line 58 with substantially enhanced angular rate components while substantially eliminating the force components.

The force containing signal on line 56 and the rate containing signal on line 58 are then applied to scaling amplifiers 60 and 62 respectively that are effective to scale the force signal by an appropriate scaling factor $K_F$ and the rate signal by an appropriate scaling factor $K_\Omega$.

The scaled analog rate signal from scaling amplifier 62 is applied over a line 64 to a multiplication circuit 66 which multiplies the rate signal by the zero mean periodic signal sgnc$\omega t$. Output on a line 68 from the sign switching circuit 66 is an analog signal having the form $K_\Omega(a_z^1 - a_z^2)\text{sgnc}\omega t$ which contains angular rate information. In the preferred embodiment of the invention, a voltage-to-frequency converter circuit 70 receives the analog signal on line 68 and converts the rate information into a frequency signal which is then applied over a line 72 to a digital counter 74. The counter 74 effectively integrates the output of the sign switching circuit 66 by counting the number of cycles of the frequency output on line 72 over the time period such as T which can represent for example one cycle of the frequency $\omega$. As shown in FIG. 5, the counter 74 receives a signal over a line 76 from the control pulse generator 40 representing the time period T. Thus, at the end of every time period T the counter 74 will output on a line 78 a digital signal $\Delta\theta$ that represents the angular rotation of the structure containing the accelerometers 10 and 12 experienced during the cycle T. This signal is then used as an input to a microprocessor indicated at 80.

In a similar manner, the scaled force signal $K_F(a_z^1 + a_z^2)$ is applied to a second voltage-to-frequency converter circuit 82 by means of a line 84 which serves to convert this analog signal into a frequency signal on line 86. A second counter 88 effectively integrates the frequency signal over a time period T and a digital signal $\Delta v$ representing the velocity change of the structure containing the accelerometers 10 and 12 over the time period T, is transmitted to the microprocessor 80 over a line 90. As a result, the microprocessor 80 receives the $\Delta\theta$ signal which corresponds to an analog rate signal $\Omega$ and a $\Delta v$ signal that corresponds to an analog force signal F.

Scaling and temperature compensation are also provided for in the circuit of FIG. 5. For example, information with respect to the preferred value of the scaling coefficients $K_F$ and $K_\Omega$ can be transmitted from the microprocessor 80 over a pair of lines 92 and 94 to the scaling amplifier 60 and 62 respectively. Appropriate temperature compensation in the microprocessor for the accelerometers 10 and 12 is provided for by means of a pair of lines 96 and 98 that transmit temperature data from temperature sensors (not shown) in each of the accelerometers 10 and 12 to the microprocessor 80.

The values of $\Delta v$ and $\Delta\theta$ can further be refined by utilizing the microprocessor 80 to calculate the values of $\Delta v$ and $\Delta\theta$ according to equations (1) and (2) as set forth below:

$$\Delta v = \frac{e_{11}(K_1 + K_2) - e_{21}(K_1 - K_2) + e_{12}(K_1 + K_2) - e_{22}(K_1 - K_2)}{8K_1K_2} \quad (1)$$

$$\Delta\theta = \frac{e_{21}(K_1 + K_2) - e_{11}(K_1 - K_2) + e_{22}(K_1 + K_2) - e_{12}(K_1 - K_2)}{8K_1K_2} \quad (2)$$

In the equations above $K_1$ is the value of the scale factor for the first accelerometer 10 and $K_2$ is the value of the scale factor for accelerometer 12. In the arrangement of FIG. 5 $e_{ij}$ represents the outputs of the counters 88 and 74 where i=1 designates the output of the second counter 88 and i=2 designates the output of the first counter 74. Similarly j indicates over which half cycle of the frequency $\omega$ that the quantity e represents. For the circuit arrangement of FIG. 5, j=1 represents the first half cycle of $\omega$ sgnc$\omega t = +1$ and j=2 represents the second half cycle where sgnc$\omega t = -1$.

As a result, if the counters 88 and 74 are dumped into the microprocessor 80 after each half cycle of $\omega$, rather than at the end of each full cycle T, the microprocessor 80 will be able to utilize the pulses accumulated in the counters 88 and 74 when the sgnc$\omega t$ function is in the $+1$ state and similarly when the sgnc$\omega t$ function is in the $-1$ state. This in effect allows the accelerometers 10 and 12 to be modeled separately in the microprocessor 80. One of the primary advantages of this approach is that the digital output can have the specific force signal cancelled to a level determined by the stability of the two scale factors $K_1$ and $K_2$ which can be 10,000/1 or greater, even though the actual analog cancellation may be limited by mathing errors to the order of 100/1.

I claim:

1. A circuit for deriving from an acceleration signal produced by an accelerometer moving with a periodic frequency $\omega$ an angular rate signal, comprising:
   sign switching means operatively connected to the accelerometer for multiplying the acceleration signal by a zero mean periodic function of frequency $\omega$;
   first conversion means operatively connected to said signal switching means for converting said multiplied acceleration signal to a first frequency e signal;
   first counter means operatively connected to said first conversion means for generating a digital angular rate signal in response to said first frequency signal wherein said said counter means includes a counter circuit responsive to the frequency $\omega$ for counting cycles of said first frequency signal over a complete cycle of said frequency $\omega$.

2. The circuit of claim 1 wherein said first conversion means includes a voltage to frequency converter circuit.

3. The circuit of claim 1 additionally including:
   second conversion means operatively connected to the accelerometer for converting said acceleration signal to a second frequency signal; and
   second counter means operatively connected to said second conversion means for generating a digital force signal in response to said second frequency signal.

4. The circuit of claim 3 wherein:
   said first conversion means includes a voltage to frequency converter circuit;
   said second conversion means includes a second voltage to frequency converter circuit; and
   said second counter means including a second counter circuit responsive to the frequency $\omega$ for counting cycles of said second frequency signal over a complete cycle of the frequency $\omega$.

5. A circuit for deriving from a pair of accelerometers which are being vibrated in a direction substantially normal to their force sensing axes at a frequency $\omega$ an angular rate signal representing the angular rate of rotation of the accelerometers, comprising:
   sign switching means operatively connected to the accelerometers for multiplying the acceleration signals from the accelerometers by a zero mean periodic function of $\omega$;
   first conversion means operatively connected to said sign switching means for converting said multiplied acceleration signals to a first frequency signal; and first counter means operatively connected to said first conversion means for generating from said first frequency signal a digital angular rate signal representing the rate of rotation of the accelerometers.

6. The circuit of claim 5 additionally including pre-separation means operatively connected between the accelerometers and said signal switching means for substantially removing force components from the acceleration signals.

7. The circuit of claim 5 additionally including:
   second conversion means operatively connected to the accelerometers for converting the accelerometer signals into second frequency signals; and
   second counter means operatively connected to said second conversion means for generating from said second frequency signal a digital force signal.

8. The circuit of claim 7 additionally including pre-separation means operatively connected between the accelerometers and said signal switching means as well as said second conversion means for removing force components from the acceleration signals applied to said sign switching means and for removing angular rotation, components from the acceleration signals applied to said second conversion means.

9. The circuit of claim 8 wherein the accelerometers are aligned with their force sensing axes in the same direction said pre-seperation means includes means for summing said acceleration signals applied to said second conversion means and for differencing said acceleration signals applied to said sign switching means.

10. The circuit of claim 8 wherein the accelerometers are aligned with their force sensing axes in opposite directions said pre-seperation means includes means for differencing said acceleration signals applied to said second conversion means and for summing said acceleration signals applied to said signal switching means.

11. The circuit of claim 8 wherein both said first and said second counter means includes counter circuits responsive to the frequency $\omega$ to accumulate digital count signals that represent the number of cycles of said first and second frequencies for a predetermined portion of a cycle of the $\omega$ frequency.

12. The circuit of claim 11 additionally including correction means operatively connected to said first and said second counter means for combining the output $e_{11}$ of said first counter circuit with the output $e_{21}$ of said second counter circuit along with values representing the scale factors $K_1$ and $K_2$ of the accelerometers for a first one of said predetermined $\omega$ cycle portions and combining the output of said first counter circuit $e_{12}$ with the output of said second counter circuit $e_{22}$ along with said scale factor values over a second one of said predetermined $\omega$ cycle portions to generate said digital angular rate signal.

13. The circuit of claim 12 wherein said first one of said predetermined $\omega$ cycle portions is a first one half of an $\omega$ cycle wherein said zero mean periodic function equals $+1$ and said second one of said predetermined $\omega$ cycle portions is a second one half of an $\omega$ cycle wherein said zero mean periodic function equals $-1$.

14. The circuit of claim 13 wherein said correction means produces said digital angular rate signal $\Delta\theta$ according to the relation:

$$\Delta\theta = $$

$$\frac{e_{21}(K_1 + K_2) - e_{11}(K_1 - K_2) + e_{22}(K_1 + K_2) - e_{12}(K_1 - K_2)}{8K_1K_2}$$

where in each counter circuit output term $e_{ij}$
   $i=1$ represents said second counter circuit,
   $i=2$ represents said first counter circuit,
   $j=1$ represents said first one half of an $\omega$ cycle, and
   $j=2$ represents said second one half of an $\omega$ cycle.

15. The circuit of claim 14 wherein said correction means also includes means for combining the outputs of said first and second counter circuits to generate said digital force signal $\Delta v$ according to the relation:

$$\Delta v = $$

$$\frac{e_{11}(K_1 + K_2) - e_{21}(K_1 - K_2) + e_{12}(K_1 + K_2) - e_{22}(K_1 - K_2)}{8K_1K_2}$$

16. A circuit for deriving from acceleration signals produced by a first and a second accelerometer which are being vibrated at a frequency $\omega$ within a frame of reference in a direction normal to their sensitive axis a force signal representing acceleration of the frame of reference along the sensitive axis and an angular rotation signal representing the angular rotation of the frame of reference about an axis normal to the direction of vibration comprising:
   a pulse generator circuit for generating pulses having a frequency functionally related to the frequency $\omega$;
   a preprocessor circuit operatively connected to both of the accelerometers including a first summing circuit for combining the acceleration signals into an analog force signal substantially without components representing angular rotation and a second summing circuit for combining the acceleration signals into an analog rate signal substantially without components representing force;
   a sign switching circuit connected to said pulse generating circuit said second summing circuit for multiplying said analog rate signal by the zero mean function signal sgncos$\omega$t;
   a first voltage to frequency converter circuit connected to said first summing circuit for converting said analog force signal into a first frequency signal;
   a second voltage to frequency converter circuit connected to said sign switching circuit for converting said multiplied analog rate signal to a second frequency signal;
   a first counter circuit connected to said pulse generator circuit for said first voltage to frequency circuit for counting the cycles of said first frequency signal over a predetermined portion of frequency $\omega$ to generate a digital force signal; and
   a second counter circuit connected to said pulse generator circuit and said second voltage to frequency circuit for counting the cycles of said second frequency signal over said predetermined portion of frequency $\omega$ to generate a digital rate signal.

17. The circuit of claim 16 additionally including a correction circuit including:
   a circuit to combine said digital force signal with said digital rate signal to generate a corrected force signal $\Delta v$ according to the relation:

$$\Delta v = \frac{e_{11}(K_1 + K_2) - e_{21}(K_1 - K_2) + e_{12}(K_1 + K_2) - e_{22}(K_1 - K_2)}{8K_1K_2}$$

and;

a circuit to combine said digital force signal with said digital rate signal to generate a corrected rate signal according to the relation:

$$\Delta \theta = \frac{e_{21}(K_1 + K_2) - e_{11}(K_1 - K_2) + e_{22}(K_1 + K_2) - e_{12}(K_1 - K_2)}{8K_1K_2}$$

where $K_1$ and $K_2$ represent the scale factors of the accelerometers and $e_{ij}$ represents the outputs of said first and second counter circuits where i denotes the individual counter circuit and j=1 denotes the first half cycle of $\omega$ and j=2 denotes the second half cycle of $\omega$.

* * * * *

UNITED STATES PATENT AND TRADEMARK OFFICE
CERTIFICATE OF CORRECTION

PATENT NO. : 4,522,062
DATED : June 11, 1985
INVENTOR(S) : Rex B. Peters

It is certified that error appears in the above-identified patent and that said Letters Patent are hereby corrected as shown below:

| | | | |
|---|---|---|---|
| In Claim 1, | Column 8, | line 26, | change "signal switching means" to --sign switching means--; |
| | | line 27 | after "frequency", delete "e" |
| In Claim 6, | Column 9, | line 7, | change "signal switching means" to --sign switching means--; |
| In Claim 7, | Column 9, | line 13, | change "second frequency signals" to --a second frequency signal--; |
| In Claim 8, | Column 9, | line 19, | change "signal switching means" to --sign switching means--; |
| In Claim 10, | Column 9, | line 37, | change "signal switching means" to --sign switching means--; |
| In Claim 12, | Column 9, | line 46, | change "$e_{11}$" to --$e_{21}$--; |
| | | line 47, | change "$e_{21}$" to --$e_{11}$--; |
| | | line 51, | change "$e_{12}$" to --$e_{22}$--; |
| | | line 52, | change "$e_{22}$" to --$e_{12}$--. |

UNITED STATES PATENT AND TRADEMARK OFFICE
CERTIFICATE OF CORRECTION

PATENT NO. : 4,522,062

DATED : June 11, 1985

INVENTOR(S) : Rex B. Peters

It is certified that error appears in the above-identified patent and that said Letters Patent is hereby corrected as shown below:

In Claim 16, Column 10, line 42, after "circuit", (1st occ.) add --and to--;

line 54, after "circuit", delete "for" and insert --and to--.

Signed and Sealed this

Twenty-seventh Day of January, 1987

Attest:

DONALD J. QUIGG

Attesting Officer    Commissioner of Patents and Trademarks